United States Patent
Ishii et al.

(10) Patent No.: US 9,954,247 B2
(45) Date of Patent: Apr. 24, 2018

(54) CATHODE MIXTURE, NON-AQUEOUS ELECTROLYTE SECONDARY BATTERY, AND ITS MANUFACTURING METHOD

(75) Inventors: Takehiko Ishii, Fukushima (JP); Mikio Watanabe, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 499 days.

(21) Appl. No.: 11/957,004

(22) Filed: Dec. 14, 2007

(65) Prior Publication Data

US 2008/0160407 A1     Jul. 3, 2008

(30) Foreign Application Priority Data

Dec. 29, 2006 (JP) .................................. 2006-356895

(51) Int. Cl.
| | |
|---|---|
| *H01M 4/48* | (2010.01) |
| *H01M 10/0525* | (2010.01) |
| *H01M 4/131* | (2010.01) |
| *H01M 4/525* | (2010.01) |
| *H01M 4/62* | (2006.01) |

(52) U.S. Cl.
CPC ....... *H01M 10/0525* (2013.01); *H01M 4/131* (2013.01); *H01M 4/483* (2013.01); *H01M 4/525* (2013.01); *H01M 4/62* (2013.01); *H01M 4/621* (2013.01); *H01M 4/624* (2013.01); *Y10T 29/49108* (2015.01)

(58) Field of Classification Search
None
See application file for complete search history.

(56) References Cited

U.S. PATENT DOCUMENTS

| | | | |
|---|---|---|---|
| 2002/0006552 A1 | 1/2002 | Ishida et al. | |
| 2002/0102459 A1 | 8/2002 | Hosoya et al. | |
| 2002/0127473 A1* | 9/2002 | Ooya ............... | H01M 4/131 429/232 |
| 2002/0141937 A1* | 10/2002 | Howard, Jr. ......... | H01M 4/131 423/599 |
| 2003/0124423 A1* | 7/2003 | Sasaki et al. ........... | 429/221 |

(Continued)

FOREIGN PATENT DOCUMENTS

| | | |
|---|---|---|
| JP | 07-220759 | 8/1995 |
| JP | 10-255842 | 9/1998 |

(Continued)

OTHER PUBLICATIONS http://www.thefreedictionary.com/blend; accessed Jul. 15, 2011.*
Japanese Office Action for Application No. JP 2006-356895 dated Jan. 6, 2009.

*Primary Examiner* — Barbara L Gilliam
*Assistant Examiner* — Adam A Arciero
(74) *Attorney, Agent, or Firm* — K&L Gates LLP

(57) ABSTRACT

A cathode mixture, a non-aqueous electrolyte secondary battery, and manufacture method thereof are provided. The cathode mixture for a non-aqueous electrolyte secondary battery includes: a cathode active material having an olivine type crystal structure; and an inorganic oxide which does not contribute to charge and discharge. A particle diameter A of the cathode active material lies within a range from 0.1 μm or more to 0.5 μm or less. There is a relation of A>B between the particle diameter A of the cathode active material and a particle diameter B of the inorganic oxide.

11 Claims, 16 Drawing Sheets

(56) References Cited

U.S. PATENT DOCUMENTS

| | | | |
|---|---|---|---|
| 2003/0134199 A1* | 7/2003 | Christian | H01M 4/06 |
| | | | 429/223 |
| 2005/0106460 A1 | 5/2005 | Otsuki et al. | |
| 2005/0266316 A1 | 12/2005 | Kitao et al. | |
| 2006/0042937 A1* | 3/2006 | Kaneda | C02F 1/4618 |
| | | | 204/293 |
| 2006/0134515 A1 | 6/2006 | Kumashiro et al. | |
| 2007/0072083 A1 | 3/2007 | Ikuta et al. | |
| 2007/0117013 A1 | 5/2007 | Hosoya et al. | |
| 2007/0245546 A1* | 10/2007 | Le Cras | H01M 4/131 |
| | | | 29/623.1 |

FOREIGN PATENT DOCUMENTS

| | | |
|---|---|---|
| JP | 2001-110414 | 4/2001 |
| JP | 2001196059 | 7/2001 |
| JP | 2004327078 | 11/2001 |
| JP | 2002-110162 | 4/2002 |
| JP | 2003-197192 | 7/2003 |
| JP | 2004-006301 | 1/2004 |
| JP | 2004259471 | 9/2004 |
| JP | 2004296108 | 10/2004 |
| JP | 2005-174792 | 6/2005 |
| JP | 2005-340056 | 12/2005 |
| JP | 2006-172966 | 6/2006 |
| JP | 2003-036889 | 12/2007 |
| JP | 2005-251554 | 12/2007 |

\* cited by examiner

CATHODE MIXTURE, NON-AQUEOUS ELECTROLYTE SECONDARY BATTERY, AND ITS MANUFACTURING METHOD

CROSS REFERENCES TO RELATED APPLICATIONS

The present application claims priority to Japanese Patent Application JP 2006-356895 filed in the Japanese Patent Office on Dec. 29, 2006, the entire contents of which being incorporated herein by reference.

BACKGROUND

The present application relates to a cathode mixture, a non-aqueous electrolyte secondary battery, and its manufacturing method. More particularly, the invention relates to a non-aqueous electrolyte secondary battery using a cathode active material having an olivine type crystal structure.

In recent years, many portable electronic apparatuses such as camera integrated type VTR (Video Tape Recorder), cellular phone, laptop computer, and the like have been put into practical use and their miniaturization and light weights have been realized. Studies and developments to improve an energy density are vigorously being progressed with respect to batteries, particularly, secondary batteries as portable power sources of those electronic apparatuses. According to a lithium ion secondary battery among batteries using a non-aqueous electrolytic solution, since a larger energy density is obtained as compared with that of a lead battery or a nickel cadmium battery as an electrolytic solution secondary battery of an aqueous solution system in the related art, an expectation degree is large and their market is remarkably growing.

Particularly, in recent years, since features such as light weight and high energy density of the lithium ion secondary battery are suitable for uses of an electric automobile and a hybrid electric automobile, an examination to realize a large size and a high power of such a battery is vigorously being progressed.

In the lithium ion secondary battery for a general use or the like, generally, lithium cobalt acid $LiCoO_2$ is mainly used as a cathode active material. However, there is a problem on a price and a supply amount from a viewpoint of an estimated amount of deposits of lithium cobalt acid. Therefore, such a tendency that a reasonable material in which anxiety about the supply amount is small is used is predicted.

Under such a situation, lithium iron phosphate $LiFePO_4$ using reasonable iron whose production amount is large is highlighted. However, according to lithium iron phosphate, since an insertion/desorption reaction of lithium at the time of battery charge and discharge is slower and an electric resistance is larger as compared with those of lithium cobalt acid used in the related art, there is such a problem that in the charge and discharge of a large current, it is difficult to obtain a sufficient charge/discharge capacitance in association with an increase in overvoltage.

With respect to such a problem, various countermeasures have been taken and, for example, the following methods (1) to (4) have been proposed.

(1) A particle diameter of an active material is reduced and a specific surface area is increased.

(2) A conductive assistant such as carbon or the like is held on the particle surface of the active material.

(3) When a cathode mixture is manufactured, carbon black, fibrous carbon, or the like is added.

(4) An adhesive force of component members is improved by using a binder having a large binding force.

Specifically speaking, the above methods (1) to (4) have been disclosed in following Patent Documents 1 to 4.

Patent Document 1: JP-A-2002-110162
Patent Document 2: JP-A-2001-110414
Patent Document 3: JP-A-2003-36889
Patent Document 4: JP-A-2005-251554

(1) In Patent Document 1, there has been disclosed such a technique that a particle diameter of the primary particle of lithium iron phosphate is limited to 3.1 µm or less and the specific surface area of the cathode active material is sufficiently increased, thereby increasing an electronic conductivity in the cathode.

(2) In Patent Documents 2 and 3, such a technique that a conductive microparticle is held on the particle surface of lithium iron phosphate and the active material is improved, thereby raising the charge/discharge capacitance in the charge/discharge of the large current has been disclosed.

(3) To reduce the electric resistance of the cathode, powdered carbon such as carbon black, flake carbon such as graphite, or fibrous carbon is generally mixed.

(4) In Patent Document 4, there has been disclosed such a technique that by using a binder having a large binding force, an adhesion between the cathode active material and the conductive assistant, an adhesion between the cathode active material and a collector, and an adhesion between the collector and the conductive assistant are improved, thereby improving characteristics at the time of the large-current charge/discharge.

The electric resistance of the cathode decreases by the foregoing methods of (1) to (4). However, to adapt to the battery for a high-power application which is used in the electric automobile, a hybrid automobile, or the like, according to lithium iron phosphate having the olivine type crystal structure, it is still difficult to obtain sufficient output characteristics as compared with those of lithium cobalt acid having a stratified structure or those of lithium manganese acid having a spinel structure.

It is also understood that if the foregoing methods of (1) and (3) are used, another problem in which life characteristics deteriorate at a high temperature also occurs.

SUMMARY

It is, therefore, desirable to provide a cathode mixture which can improve output characteristics and life characteristics at a high temperature in a non-aqueous electrolyte secondary battery using a cathode active material having an olivine type crystal structure and to provide a non-aqueous electrolyte secondary battery using such a cathode mixture and its manufacturing method according to an embodiment.

The following points (A) and (B) are identified as at least some issues associated with the related arts.

(A) Output Characteristics

Since the electronic conductivity in the cathode containing the cathode active material having the olivine type crystal structure is low, the higher output characteristics are demanded in order to develop the application to a high-power use. The foregoing methods of (1) to (4) have been proposed to satisfy such a demand. However, if only the above methods are used, the output characteristics are still insufficient in order to adapt to the battery for the high-power application which is used in the electric automobile, hybrid automobile, or the like, and it is demanded to further improve the power.

(B) Life Characteristics at a High Temperature

It has been found that if the foregoing methods of (1) and (3) are used, another problem in which the life characteristics deteriorate occurs. That is, in the case of improving the output characteristics by (1) reducing the particle diameter of the active material itself and increasing the specific surface area or (3) adding carbon black or the like having a large specific surface area, a necessary amount of the binder increases in order to stabilize a slurry nature which is necessary when a coating electrode is manufactured. Therefore, an influence of a swelling degree of the binder increases at the high temperature and the electronic conductivity between the active materials and the electronic conductivity between the active material and a collector deteriorate, so that the life characteristics deteriorate.

To improve (A) the output characteristics and (B) the life characteristics at the high temperature, it has been found that a dispersing state of the conductive assistant, high molecular binder, or the like is largely concerned with (A) the improvement of the output characteristics and (B) the improvement of the life characteristics. More specifically, the following points are described below with respect to (A) the output characteristics and (B) the life characteristics.

(A) With Respect to the Output Characteristics

In the case of manufacturing the cathode containing the cathode active material of the olivine type crystal structure, generally, the cathode active material of a small particle diameter is used and the conductive assistant such as a carbon powder or the like in which a particle diameter is further smaller than such a particle diameter and a specific surface area is larger than that of the cathode active material is used, thereby raising the electronic conductivity of an electrode. If the electronic conductivity is raised in this manner, when a slurry for manufacturing the electrode is manufactured by mixing the conductive assistant, the binder, and the cathode active material having the olivine type crystal structure with a solvent, the conductive assistant and the binder are aggregated to the cathode active material particle and an inherent role of the conductive assistant is lost. Thus, such a problem that the electronic conductivity of the cathode is deteriorated is caused.

(B) With Respect to the Life Characteristics

If the foregoing methods of (1) and (3) are used, a necessary addition amount of the binder increases. Therefore, if the dispersing state of the binder deteriorates and it is segregated, the binder is locally swelled at the high temperature and the electronic conductivity between the active materials deteriorates, so that the life characteristics deteriorate. Specifically speaking, if cycle tests are executed at the high temperature, the electronic conductivity between the active materials is largely deteriorated due to the swelling of the binder as compared with that of a stratified oxide such as cobalt Co, nickel Ni, or the like in the related art and the life characteristics are adversely influenced.

Therefore, a number of experiments have been conducted, demonstrating improvement of the dispersing state of the conductive assistant, binder, or the like according to an embodiment. Thus, it has been found that by setting a particle diameter of the active material to a value within a range from 0.1 μm or more to 0.5 μm or less and adding particles of an inorganic oxide smaller than the particle diameter of the active material, the dispersing state of the conductive assistant, binder, or the like can be improved, that is, the electronic conductivity of the cathode can be improved and the life characteristics at the high temperature can be improved.

According to an embodiment, there is provided a cathode mixture for a non-aqueous electrolyte secondary battery, comprising: a cathode active material having an olivine type crystal structure; and an inorganic oxide which does not contribute to charge and discharge, wherein a particle diameter A of the cathode active material lies within a range from 0.1 μm or more to 0.5 μm or less and there is a relation of A>B between the particle diameter A of the cathode active material and a particle diameter B of the inorganic oxide.

According to another embodiment, there is provided a non-aqueous electrolyte secondary battery comprising: a cathode; an anode; and a non-aqueous electrolyte, wherein the cathode contains a cathode active material having an olivine type crystal structure and an inorganic oxide which does not contribute to charge and discharge, a particle diameter A of the cathode active material lies within a range from 0.1 μm or more to 0.5 μm or less, and there is a relation of A>B between the particle diameter A of the cathode active material and a particle diameter B of the inorganic oxide.

According to still another embodiment, there is provided a manufacturing method of a non-aqueous electrolyte secondary battery, comprising the steps of mixing and dispersing a cathode active material having an olivine type crystal structure and an inorganic oxide which does not contribute to charge and discharge; and manufacturing a cathode by the dispersed cathode active material and the dispersed inorganic oxide, wherein a particle diameter A of the cathode active material lies within a range from 0.1 μm or more to 0.5 μm or less, and there is a relation of A>B between the particle diameter A of the cathode active material and a particle diameter B of the inorganic oxide.

The inorganic oxide which does not contribute to the charge and discharge indicates an inorganic oxide containing no lithium Li.

According to an embodiment, since the particle diameter of the active material lies within the range from 0.1 μm or more to 0.5 μm or less and the particle of the inorganic oxide smaller than the particle diameter of the active material has been added, the segregation and cohesion of the conductive assistant, binder, and the like are improved. Thus, the electronic conductivity of the cathode mixture can be raised. Since the segregation of the binder is reduced, the local swelling of the binder at a high temperature can be suppressed.

As described above, according to an embodiment, the electronic conductivity of the electrode can be raised and the life characteristics at the high temperature can be improved.

Additional features and advantages are described herein, and will be apparent from, the following Detailed Description and the figures.

BRIEF DESCRIPTION OF THE FIGURES

DETAILED DESCRIPTION (1) First Embodiment (1-1) Construction of Non-Aqueous Electrolyte Secondary Battery FIG. 1 is an exploded perspective view showing an example of a construction of a non-aqueous electrolyte secondary battery according to the first embodiment. As shown in FIG. 1, according to the non-aqueous electrolyte secondary battery, a battery element 1 to which a cathode lead 3 and an anode lead 4 have been attached is enclosed in a film-shaped sheathing member 2, and a miniaturization, a light weight, and a thin shape can be realized.

The cathode lead 3 and the anode lead 4 are directed from the inside to the outside of the sheathing member 2 and are led out, for example, in the same direction, respectively. Each of the cathode lead 3 and the anode lead 4 is made of a metal material such as aluminum Al, copper Cu, nickel Ni, stainless, or the like and is formed in a thin plate shape or a mesh shape.

The sheathing member 2 is made of a rectangular aluminum laminate film obtained by adhering, for example, a nylon film, an aluminum foil, and a polyethylene film in this order. According to the sheathing member 2, for example, the polyethylene film side and the battery element 1 are arranged so as to face each other and their outer edge portions are mutually adhered by a welding or with an adhesive agent. Although not shown, an adhesive film for preventing an invasion of the outside air has been inserted between the sheathing member 2 and the cathode lead 3 and an adhesive film has also been similarly inserted between the sheathing member 2 and the anode lead 4. The adhesive film is made of a material having an adhesion to the cathode lead 3 and the anode lead 4. For example, it is made of a polyolefin resin such as polyethylene, polypropylene, denatured polyethylene, denatured polypropylene, or the like. The sheathing member 2 may be constructed by another material in place of the foregoing aluminum laminate film. That is, it can be also constructed by a laminate film having another structure, a high molecular film made of polypropylene or the like, or a metal film.

Figure 1:
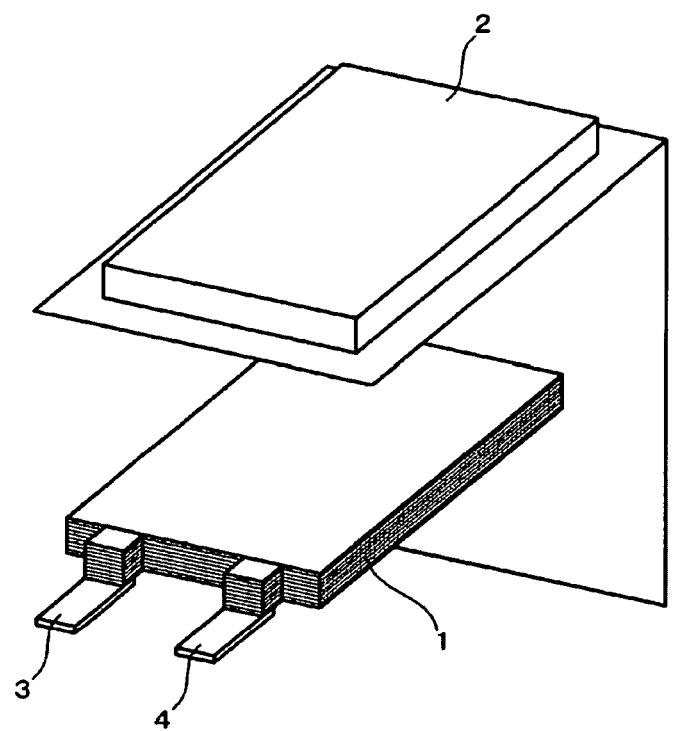
FIG. 1 is an exploded perspective view showing an example of a construction of a non-aqueous electrolyte secondary battery according to a first embodiment.
Figure 2:
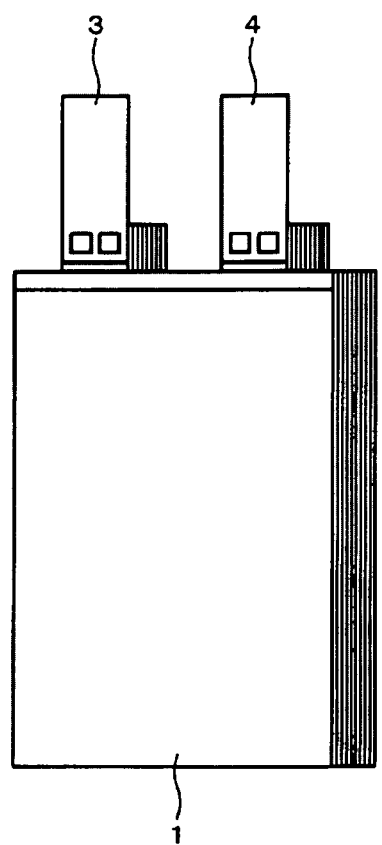
FIG. 2 is a plan view showing an example of an external appearance of a battery element.
Figure 3:
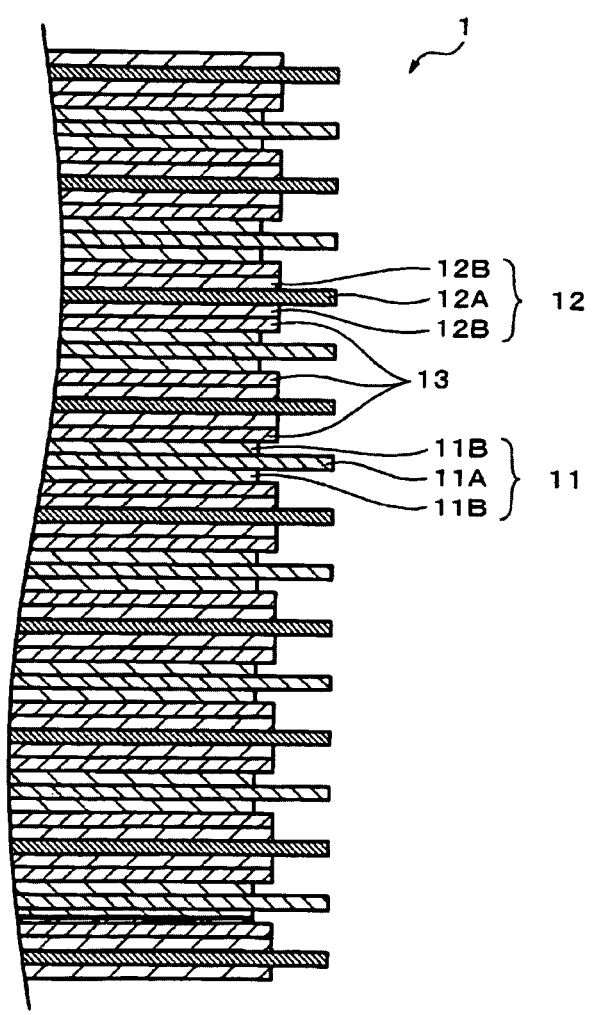
FIG. 3 is a cross sectional view showing an example of a construction of the battery element.

FIG. 2 is a plan view showing an example of an external appearance of the battery element 1. FIG. 3 is a cross sectional view showing an example of a construction of the battery element 1. As shown in FIGS. 2 and 3, the battery element 1 is a laminate electrode member in which a cathode 11 and an anode 12 are laminated through a separator 13. An electrolytic solution as a liquid electrolyte has been dipped into the separator 13.

Figure 4:
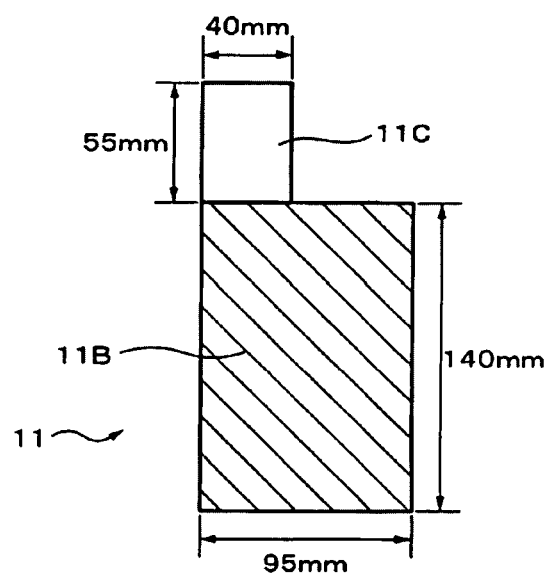
FIG. 4 is a plan view showing an example of a shape of a cathode.

The cathode 11 has a structure in which, for example, cathode mixture layers 11B are formed on both surfaces of a cathode collector 11A having a pair of surfaces. As shown in FIG. 4, the cathode 11 has a rectangular electrode portion and a collector exposed portion 11C extending from one side of the electrode portion. The cathode mixture layer 11B is not provided for the collector exposed portion 11C and the cathode collector 11A is exposed. The collector exposed portion 11C is electrically connected to the cathode lead 3. Although not shown, the cathode mixture layer 11B can be also provided only for one surface of the cathode collector 11A. The cathode collector 11A is made of, for example, a metal foil such as an aluminum foil or the like.

The cathode mixture layer 11B contains, for example: one, two, or more kinds of cathode active materials into/from which lithium can be doped and dedoped; and an inorganic oxide which does not contribute to charge and discharge. As necessary, the cathode mixture layer 11B contains: a conductive assistant such as graphite or the like; and a high molecular binder such as polyvinylidene fluoride or the like.

A particle diameter A of the cathode active material lies within a range from 0.1 μm to 0.5 μm. If the particle diameter A is less than 0.1 μm, the cathode active material is secondarily aggregated. Therefore, 0.1 μm is an almost limit value of the particle diameter which can be handled. If the particle diameter A is equal to or less than 0.5 μm, output characteristics can be improved. There is a relation of A>B, that is, B/A<1 between the particle diameter A of the cathode active material and a particle diameter B of the inorganic oxide. This is because if A>B, that is, B/A<1, the output characteristics can be improved.

It is preferable that a content of the inorganic oxide lies within a range from 0.1 wt % to 5 wt % or less. This is because if the content lies within the range from 0.1 wt % to 5 wt % or less, the life characteristics at the high temperature can be further improved. Much preferably, the content lies within a range from 1.0 wt % or more to 5.0 wt % or less. This is because if the content is equal to or more than 1.0 wt %, an effect owing to the addition of the inorganic oxide starts to appear remarkably and, if the content exceeds 5.0 wt %, since an addition amount is too large, the electronic conductivity deteriorates.

It is preferable that a content of the conductive assistant lies within a range from 1.5 wt % or more to 5 wt % or less. Much preferably, the content lies within a range from 2 wt % or more to 10 wt % or less. If the content is equal to or more than 1.5 wt %, the effect owing to the addition of the inorganic oxide starts to appear remarkably and, if the content is equal to or more than 2 wt %, the effect owing to the addition of the inorganic oxide becomes remarkable. If an addition amount of the conductive assistant is equal to or more than 1.5 wt %, a similar effect is obtained. However, there is such a problem that if the addition amount of the conductive assistant exceeds 10 wt %, an energy density of the battery decreases. Therefore, it is preferable that the addition amount lies within the range from 2 wt % or more to 10 wt % or less.

As a cathode active material into/from which lithium can be doped and dedoped, for example, a cathode active material having an olivine type crystal structure shown in Formula 1 can be used.

$$Li_xM1PO_4 \quad \text{(Formula 1)}$$

In the formula, M1 denotes at least one kind selected from a group including cobalt Co, manganese Mn, iron Fe, nickel Ni, magnesium Mg, aluminum Al, boron B, titanium Ti, vanadium V, niobium Nb, copper Cu, zinc Zn, molybdenum Mo, calcium Ca, strontium Sr, tungsten W, and zirconium Zr; x is set to a value within a range of $0.9 \leq x \leq 1.1$; a composition of lithium differs depending on a charging/discharging state; and the value of x indicates a value in the full discharging state.

As an inorganic oxide which does not contribute to the charge and discharge, for example, an oxide of a metal or a semimetal can be mentioned. For example, an oxide of a transition element such as lanthanoids or the like, an oxide of group 13 (boron group), an oxide of group 15 (nitrogen group), or the like can be used. One, two, or more kinds of those oxides may be mixed and used. As such an oxide, more specifically speaking, at least one kind including, for example, $Al_2O_3$, $ZrO_2$, $Sc_2O_3$, $Y_2O_3$, $Bi_2O_3$, $La_2O_3$, $CeO_2$, $Nd_2O_3$, and $Sm_2O_3$ can be used.

Figure 5:
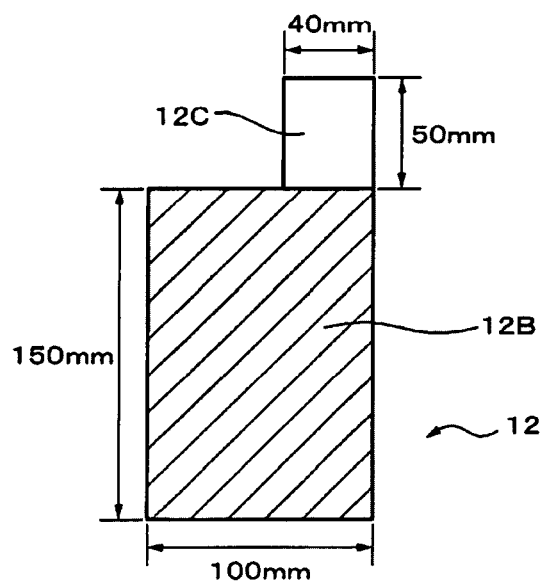
FIG. 5 is a plan view showing an example of a shape of an anode.

The anode 12 has a structure in which, for example, anode mixture layers 12B are formed on both surfaces of an anode collector 12A having a pair of surfaces. As shown in FIG. 5, the anode 12 has a rectangular electrode portion and a collector exposed portion 12C extending from one side of the electrode portion. The anode mixture layer 12B is not provided for the collector exposed portion 12C and the anode collector 12A is exposed. The collector exposed portion 12C is electrically connected to the anode lead 4. Although not shown, the anode mixture layer 12B can be also provided only for one surface of the anode collector 12A. The anode collector 12A is made of, for example, a metal foil such as a copper foil or the like.

As an anode active material, the anode mixture layer 12B contains one, two, or more kinds of anode active materials into/from which lithium Li can be doped and dedoped. As necessary, the anode mixture layer 12B contains: a conductive assistant such as graphite or the like; and a high molecular binder such as polyvinylidene fluoride or the like.

In the non-aqueous electrolyte secondary battery, an electrochemical equivalent of the anode 12 into/from which lithium Li can be doped and dedoped is larger than that of the cathode 11, thereby preventing a lithium metal from being precipitated in the anode 12 during the charging.

As an anode material which can dope and dedope lithium, for example, a carbon material such as non-easy-graphitizable carbon i.e. hard carbon, easy-graphitizable carbon i.e. soft carbon, graphite, pyrolytic carbon class, coke class, glassy carbon class, organic high molecular compound baked material, carbon fiber, activated charcoal, or the like can be mentioned. Among them, there is a pitch coke, a needle coke, a petroleum coke, or the like as a coke class. The organic high molecular compound baked material denotes a material obtained by baking a high molecular material such as phenol resin, fran resin, or the like at a proper temperature and carbonating it. A part of those materials are classified into non-easy-graphitizable carbon i.e. hard carbon, or easy-graphitizable carbon i.e. soft carbon. Polyacetylene, polypyrrole, or the like can be mentioned as a high molecular material. Those carbon materials are preferable because a change in crystal structure which is caused upon charging or discharging is very small, a high charge/discharge capacitance can be obtained, and good cycle characteristics can be obtained. Particularly, the graphite is preferable because the electrochemical equivalent is large and the high energy density can be obtained. The non-easy-graphitizable carbon i.e. hard carbon, is preferable because excellent characteristics can be obtained. Further, a material whose charge/discharge potential is low, specifically speaking, a material whose charge/discharge potential is close to that of the lithium metal is preferable because the high energy density of the battery can be easily realized.

As an anode material which can dope and dedope lithium, a material which can dope and dedope lithium and contains at least one kind selected from a metal element and a semimetal element as a component element can be also mentioned. By using such a material, the high energy density can be obtained. Particularly, if it is used together with the carbon material, since the high energy density can be obtained and the excellent cycle characteristics can be obtained, it is more preferable. Such an anode material may be a sole element of the metal element or the semimetal element, an alloy of them, or a compound of them. A material containing a phase or phases of one, two, or more kinds of them in at least a part of it. In the invention, in addition to an alloy containing two or more kinds of metal elements, an alloy containing one or more kinds of metal elements and one or more kinds of semimetal elements is also incorporated. The material may also contain a non-metal element. As its texture, there is a solid solution, an eutectic (eutectic mixture), an intermetallic compound, or a texture in which two or more kinds of them coexist As such a metal element or semimetal element constructing the anode material, for example, magnesium, boron, aluminum, gallium Ga, indium In, silicon Si, germanium Ge, tin, lead Pb, bismuth Bi, cadmium Cd, silver Ag, zinc, hafnium Hf, zirconium, yttrium Y, palladium Pd, or platinum Pt can be mentioned. They may be crystalline or amorphous.

Among them, as an anode material, a material containing a metal element or a semimetal element of the 4B group in the short period type periodic table as a component element is preferable. A material containing at least either silicon or tin as a component element is particularly preferable. This is because according to silicon and tin, an ability of doping and dedoping lithium is high and the high energy density can be obtained.

As an alloy of tin, for example, an alloy containing at least one kind selected from a group including silicon, nickel, copper, iron, cobalt, manganese, zinc, indium, silver, titanium Ti, germanium, bismuth, antimony Sb, and chromium as a second component element other than tin can be mentioned. As an alloy of silicon, for example, an alloy containing at least one kind selected from a group including tin, nickel, copper, iron, cobalt, manganese, zinc, indium, silver, titanium, germanium, bismuth, antimony, and chromium as a second component element other than silicon can be mentioned.

As a compound of tin or a compound of silicon, for example, a compound containing oxygen O or carbon C can be mentioned. In addition to tin or silicon, the foregoing second component element may be contained.

As an anode material which can dope and dedope lithium, further, another metal compound or a high molecular material can be mentioned. As another metal compound, an oxide such as $MnO_2$, $V_2O_5$, $V_6O_{13}$, or the like, a sulfide such as NiS, MoS, or the like, or a lithium nitride such as $LiN_3$ or the like can be mentioned. As a high molecular material, polyacetylene, polyaniline, polypyrrole, or the like can be mentioned.

Figure 6:
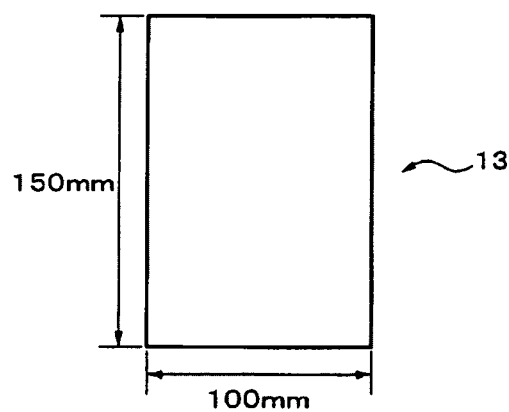
FIG. 6 is a plan view showing an example of a shape of a separator.

As shown in FIG. 6, as a separator 13, an arbitrary separator which has a shape such as a rectangular shape or the like, is electrically stable, and is chemically stable for the cathode active material, anode active material, or solvent may be used so long as it does not have the electric conductivity. For example, a high molecular nonwoven fabric cloth, a porous film, or a sheet obtained by forming a fiber of glass or ceramics into a paper shape can be used, or a laminate sheet obtained by laminating a plurality of those materials may be used. Particularly, it is preferable to use a porous polyolefin film. A composite sheet obtained by combining such a film with a heat resistant material made of a fiber of polyimide, glass, or ceramics, or the like may be used.

An electrolytic solution contains a solvent and an electrolytic salt dissolved into the solvent. Cyclic carbonic ester such as ethylene carbonate, propylene carbonate, or the like can be used as a solvent. It is preferable that either ethylene carbonate or propylene carbonate or, particularly, both of them are mixed and used. This is because the cycle characteristics can be improved.

As a solvent, it is preferable to mix and use chain-like carbonic ester such as diethyl carbonate, dimethyl carbonate, ethylmethyl carbonate, methylpropyl carbonate, or the like in addition to those cyclic carbonic ester. This is because the high ion conductivity can be obtained.

Further, as a solvent, it is preferable to contain 2,4-difluoroanisole or vinylene carbonate. This is because in the case of 2,4-difluoroanisole, the discharge capacitance can be improved and in the case of vinylene carbonate, the cycle characteristics can be improved. Therefore, if they are mixed and used, since the discharge capacitance and the cycle characteristics can be improved, it is preferable.

As other solvents, the following materials can be mentioned: butylene carbonate, γ-butyrolactone, γ-valerolactone, 1,2-dimethoxy ethane, tetrahydrofuran, 2-methyl tetrahydrofuran, 1,3-dioxorane, 4-methyl-1,3-dioxorane, methyl acetate, methyl propionate, acetonitrile, glutaronitrile, adiponitrile, methoxy acetonitrile, 3-methoxy propylonitrile, N,N-dimethyl formamide, N-methyl pyrrolidinone, N-methyl oxazolidinone, N,N-dimethyl imidazolidinone, nitromethane, nitroethane, sulfolan, dimethyl sulfoxide, trimethyl phosphate, and the like.

There is also a case where a compound in which hydrogen in at least a part of those non-aqueous solvents has been replaced by fluorine is preferable because there is a case where the reversibility of the electrode reaction can be improved in dependence on the kind of electrode which is combined.

As an electrolytic salt, for example, a lithium salt can be mentioned. One kind can be solely used or two or more kinds can be also mixed and used. As a lithium salt, $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, difluoro [oxolato-O,O'] lithium boric acid, lithium bisoxalate borate, LiBr, or the like can be mentioned. Among them, $LiPF_6$ is preferable because the high ion conductivity can be obtained and the cycle characteristics can be improved.

(1-2) Manufacturing Method of Non-Aqueous Electrolyte Secondary Battery

The non-aqueous electrolyte secondary battery constructed as mentioned above can be manufactured, for example, as follows.

(Manufacturing of Cathode)

The cathode 11 is manufactured as follows. First, a cathode mixture is adjusted and formed by mixing, for example the cathode active material, the inorganic oxide which does not contribute to the charge and discharge, the binder, and the conductive assistant. A paste-like cathode mixture paint is formed by dispersing the cathode mixture into a solvent such as N-methyl pyrolidone or the like. Subsequently, both surfaces of the cathode collector 11A are coated with the cathode mixture paint, the paint is dried, and thereafter, they are pressed, thereby forming the cathode mixture layers 11B. After that, by cutting them into the shape as shown in FIG. 4 or the like, the cathode 11 is obtained.

(Manufacturing of Anode)

The anode 12 is manufactured as follows. First, an anode mixture is adjusted and formed by mixing, for example, the anode active material, the binder, and the conductive assistant. A paste-like anode mixture paint is formed by dispersing the anode mixture into a solvent such as N-methyl pyrolidone or the like. Subsequently, both surfaces of the anode collector 12A are coated with the anode mixture paint, the paint is dried, and thereafter, they are pressed, thereby forming the anode mixture layers 12B. After that, by cutting them into the shape as shown in FIG. 5 or the like, the anode 12 is obtained.

(Manufacturing of Battery Element)

The battery element 1 is manufactured as follows. First, a microporous film made of polypropylene or the like is cut into the shape as shown in FIG. 6, thereby manufacturing the separator 13. Subsequently, for example, as shown in FIG. 3, a plurality of anodes 12, cathodes 11, and separators 13 obtained as mentioned above are laminated in order of the anode 12, separator 13, cathode 11, . . . , cathode 11, separator 13, and anode 12, thereby forming the battery element.

Subsequently, the collector exposed portion 11C of the cathode 11 is welded to the cathode lead 3. Similarly, the collector exposed portion 12C of the anode 12 is welded to the anode lead 4. Subsequently, after the electrolytic solution was dipped into the battery element 1, the battery element 1 is sandwiched between the sheathing members 2 and outer edge portions of the sheathing members 2 are adhered by thermal welding or the like, thereby sealing the battery element 1. In this instance, the battery element is sealed so that the cathode lead 3 and the anode lead 4 are exposed to the outside of the sheathing members 2 through the thermally welded portions and those leads are used as a cathode terminal and an anode terminal. In this manner, the desired non-aqueous electrolyte secondary battery whose capacitance is equal to, for example, 1 Ah is obtained.

As mentioned above, according to a first embodiment, the cathode mixture contains: the cathode active material having the olivine type crystal structure; and the inorganic oxide which does not contribute to the charge and discharge, the particle diameter A of the cathode active material lies within the range from 0.1 µm or more to 0.5 µm or less, and there is the relation of A>B between the particle diameter A of the cathode active material and the particle diameter B of the inorganic oxide. Therefore, the conductive assistant and the binder can be adhered to the inorganic oxide and dispersed. Thus, the dispersing state of the cathode active material of the olivine type crystal structure, the conductive assistant, and the binder can be improved. That is, the electronic conductivity in the cathode 11 using the cathode active material of the olivine type crystal structure can be improved. Further, the method whereby the life characteristics at the high temperature can be improved by reducing the swelling that is caused by the local segregation of the binder at the high temperature is proposed.

In the lithium cobalt acid of the stratified structure and the lithium manganese acid of the spinel structure which are used as cathode active materials in the related art, the method whereby the inorganic oxide is mixed has been proposed.

As a technique for mixing the inorganic oxide in the lithium cobalt acid of the stratified structure and the lithium manganese acid of the spinel structure, there are the following techniques.

In JP-A-2005-340056 (hereinbelow, referred to as Patent Document 5), the following technique has been disclosed: 0 the $Al_2O_3$ microparticle is adhered onto the surface of the active material, thereby preventing the active material surface from being directly come into contact with the electrolytic solution, so that the deterioration of the active material surface is suppressed and charge/discharge cycle characteristics at the high temperature can be improved.

In JP-A-2003-197192 (hereinbelow, referred to as Patent Document 6), the following technique has been disclosed: by coating the surface of the secondary particle of the active material of the lithium manganese acid of the spinel structure with a metal oxide, an elution of manganese due to the reaction between the electrolytic solution and the active material at the high temperature is suppressed.

The present application in an embodiment is now compared with the inventions disclosed in Patent Documents 5 and 6. In an embodiment, the conductive assistant and the binder are adhered onto the inorganic oxide, and the inorganic oxide and the cathode active material are dispersed. In the disclosure of Patent Documents 5 and 6, the inorganic oxide is adhered onto the surface of the cathode active material or the surface of the cathode active material is coated with the inorganic oxide.

Although the inorganic oxide such as $Al_2O_3$ or the like is adhered onto the surface of the cathode active material in the related arts, according to an embodiment, the conductive assistant and the binder are adhered onto the inorganic oxide and dispersed, thereby applying the efficient electronic conductivity to the active material.

In JP-A-2004-6301 (hereinbelow, referred to as Patent Document 7), the following technique has been disclosed: the inorganic oxide is dispersed between the lithium containing oxide particles each having a particle diameter of 1 μm or more, a gap is caused between the lithium containing oxide particles, and the electrolytic solution is efficiently dipped into the gap, thereby raising an efficiency of a contact area of the electrolytic solution and the lithium containing composite oxide, so that a using ratio of the lithium containing composite oxide rises and the charge/discharge capacitance is improved.

When comparing the present application with the disclosure in Patent Document 7, at least the following differences are noted:

(a) Although the conductive assistant and the binder are adhered onto the inorganic oxide and the inorganic oxide is dispersed into the cathode active material according to an embodiment, according to Patent Document 7, the conductive assistant and the binder are not adhered onto the inorganic oxide.

(b) Although the particle diameter A of the cathode active material lies within the range from 0.1 μm to 0.5 μm in an embodiment, according to Patent Document 7, the particle diameter A of the cathode active material is equal to or more than 1 μm.

(c) Although the particle diameter A of the cathode active material and the particle diameter B of the inorganic oxide have the relation of A>B in an embodiment, according to Patent Document 7, such a relation between the particle diameters is not selected.

In Patent Document 7, nothing is disclosed with respect to actual data regarding the cathode active material having the olivine type crystal structure.

According to an embodiment, there is obtained such an effect that by dispersing the inorganic oxide as mentioned above, electronic conductivity of the cathode containing the cathode active material of the olivine type crystal structure can be improved. It is difficult to derive such an effect according to the inventions disclosed in Patent Documents 5 to 7.

(2) Second Embodiment

Another embodiment will now be described. A non-aqueous electrolyte secondary battery according to the second embodiment uses a gel-like electrolyte layer in place of the electrolytic solution as a liquid electrolyte in the secondary battery of the first embodiment. Portions similar to those in the first embodiment mentioned above are designated by the same reference numerals and their explanation is omitted here.

(2-1) Structure of Non-Aqueous Electrolyte Secondary Battery

Figure 7:
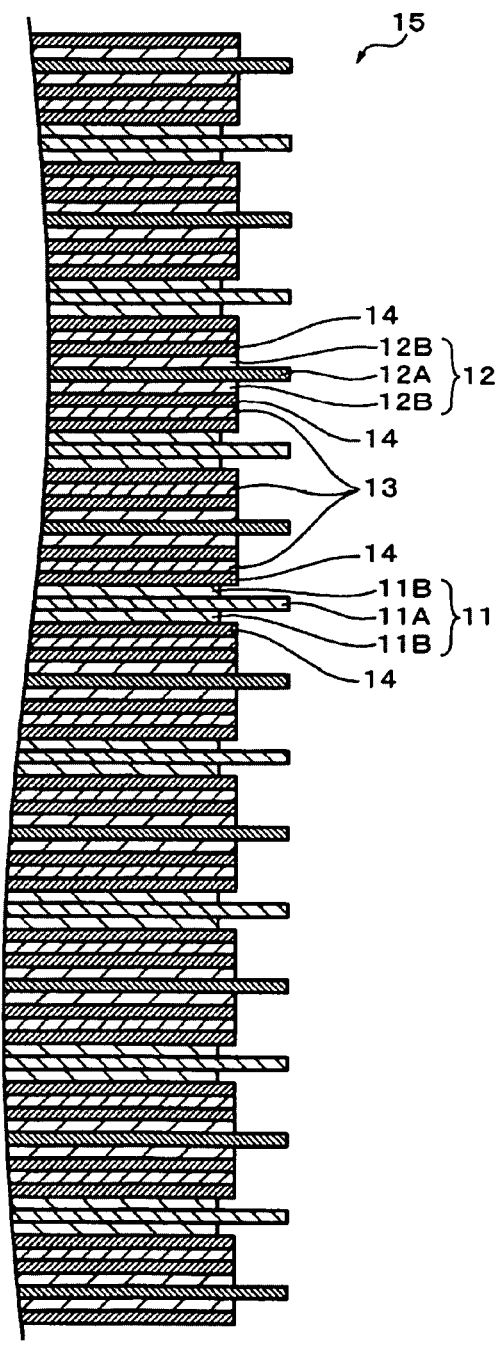
FIG. 7 is a cross sectional view showing an example of a construction of a battery element which is used in a non-aqueous electrolyte secondary battery according to a second embodiment.

FIG. 7 is a cross sectional view showing an example of a construction of a battery element which is used in the non-aqueous electrolyte secondary battery according to the second embodiment. A battery element 15 is formed by laminating the cathodes 11 and anodes 12 through the separators 13 and electrolyte layers 14.

The electrolyte layer 14 includes an electrolytic solution and a high molecular compound serving as a holder to hold the electrolytic solution and is in what is called a gel-state. The gel-like electrolyte layer 14 is preferable because high ion conductivity can be obtained and a leakage of the solution of the battery can be prevented. A construction of the electrolytic solution (that is, solvent, electrolytic salt, or the like) is similar to that of the non-aqueous electrolyte secondary battery according to the first embodiment. As a high molecular compound, for example, there can be mentioned: polyacrylonitrile; polyvinylidene fluoride; copolymer of vinylidene fluoride and hexafluoro propylene; polytetrafluoro ethylene; polyhexafluoro propylene; polyethylene oxide; polypropylene oxide; polyphosphazene; polysiloxane; polyvinyl acetate; polyvinyl alcohol; polymethyl methacrylate; polyacrylic acid; polymethacrylate; styrene-butadiene rubber, nitrile-butadiene rubber; polystyrene, polycarbonate; or the like. Polyacrylonitrile, polyvinylidene fluoride, polyhexafluoro propylene, or polyethylene oxide is preferable, particularly, from a viewpoint of electrochemical stability.

(2-2) Manufacturing Method of Non-Aqueous Electrolyte Secondary Battery

The non-aqueous electrolyte secondary battery constructed as mentioned above can be manufactured, for example, as follows.

First, each of the cathode 11 and anode 12 is coated with a presolution containing a solvent, an electrolytic salt, a high molecular compound, and a mixed solvent and the mixed solvent is volatilized, thereby forming the electrolyte layers 14. The non-aqueous electrolyte secondary battery can be obtained by subsequent processing steps similar to those in the foregoing first embodiment except that the cathode 11 and anode 12 formed with the electrolyte layers 14.

According to the second embodiment, effects similar to those in the foregoing first embodiment can be obtained.

(3) Third Embodiment (3-1) Construction of Non-Aqueous Electrolyte Secondary Battery A construction of a secondary battery according to the third embodiment will now be described with reference to FIGS. 8 and 9.

Figure 8:
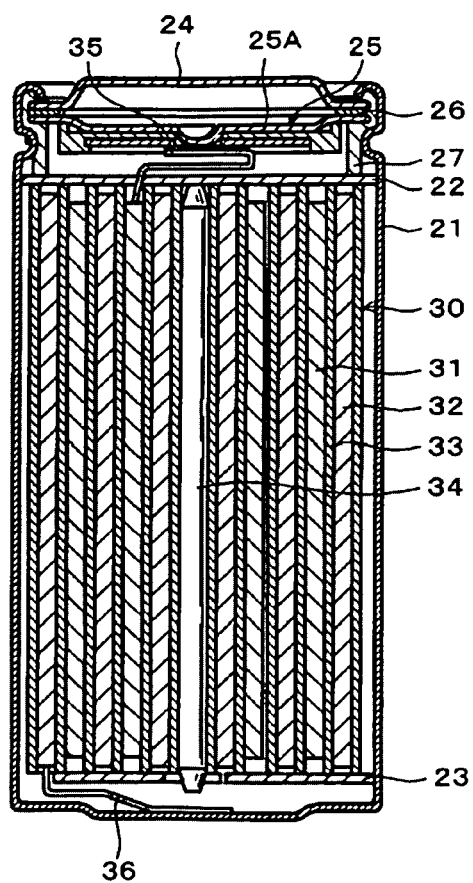
FIG. 8 is a cross sectional view showing an example of a construction of a non-aqueous electrolyte secondary battery according to a third embodiment.

FIG. 8 is a cross sectional view showing an example of a construction of a non-aqueous electrolyte secondary battery according to the third embodiment. This battery is what is called a cylindrical type and a winded electrode member 30 around which a pair of belt-shaped cathode 31 and a belt-shaped anode 32 have been wound through a separator 33 is provided in an almost hollow cylindrical battery can 21. An electrolytic solution as a liquid electrolyte is impregnated in the separator 33. The battery can 21 is made of, for example, iron Fe plated with nickel Ni. One end portion of the battery can 21 is closed and the other end portion is open. A pair of insulating plates 22 and 23 are respectively arranged perpendicularly to a wound peripheral surface so as to sandwich the winded electrode member 30.

A battery cap 24 and a relief valve mechanism 25 and a thermally-sensitive resistive element (PTC element: Positive Temperature Coefficient element) 26 provided in the battery cap 24 are caulked through a gasket 27 and attached to the open end portion of the battery can 21. The inside of the battery can 21 is sealed. The battery cap 24 is made of, for example, a material similar to that of the battery can 21. The relief valve mechanism 25 is electrically connected to the battery cap 24 through the PTC element 26. When an inner pressure of the battery rises to a predetermined value or more due to an inner short-circuit, heating from the outside, or the like, a disk plate 25A is turned round, thereby disconnecting the electrical connection between the battery cap 24 and the winded electrode member 30. When a temperature rises, a current is limited due to an increase in resistance value of the PTC element 26 and abnormal heat generation by the large current is prevented. The gasket 27 is made of, for example, an insulating material and its surface is coated with asphalt.

The winded electrode member 30 is wound around, for example, a center pin 34 as a center. A cathode lead 35 made of aluminum Al or the like is connected to the cathode 31 of the winded electrode member 30. An anode lead 36 made of nickel or the like is connected to the anode 32. The cathode lead 35 is welded to the relief valve mechanism 25, so that it is electrically connected to the battery cap 24. The anode lead 36 is welded and electrically connected to the battery can 21.

Figure 9:
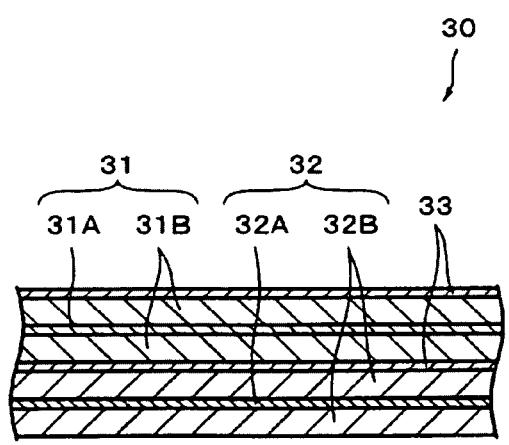
FIG. 9 is a cross sectional view enlargedly showing a part of a winded electrode member shown in FIG. 8.

FIG. 9 is a cross sectional view enlargedly showing a part of the winded electrode member 30 shown in FIG. 8. The winded electrode member 30 is formed by laminating the cathode 31 and anode 32 through the separator 33 and winding them.

The cathode 31 has, for example: a cathode collector 31A; and cathode mixture layers 31B formed on both surfaces of the cathode collector 31A. The anode 32 has, for example: an anode collector 32A; and anode mixture layers 32B formed on both surfaces of the anode collector 32A. Constructions of the cathode collector 31A, cathode mixture layer 31B, anode collector 32A, anode mixture layer 32B, separator 33, and an electrolytic solution are similar to those of the cathode collector 11A, cathode mixture layer 11B, anode collector 12A, anode mixture layer 12B, separator 13, and electrolytic solution in the foregoing first embodiment.

(3-2) Manufacturing Method of Non-Aqueous Electrolyte Secondary Battery

The non-aqueous electrolyte secondary battery constructed as mentioned above can be manufactured, for example, as follows.

First, the cathode mixture is adjusted, for example, by mixing, the cathode active material, conductive material, and binder, the cathode mixture is dispersed into the solvent such as 1-methyl-2-pyrolidone or the like, thereby forming the paste-like cathode mixture slurry. Subsequently, the cathode collector 31A is coated with the cathode mixture slurry, the solvent is dried, thereafter, the obtained collector is compression-molded by a roll pressing machine or the like, and the cathode active material layer 31B is formed. Thus, the cathode 31 is obtained.

For example, the anode active material and binder are mixed and the anode mixture is adjusted. This anode mixture is dispersed into the solvent such as 1-methyl-2-pyrolidone or the like, thereby forming the anode mixture slurry. Subsequently, the anode collector 32A is coated with the anode mixture slurry, the solvent is dried, and thereafter, the obtained collector is compression-molded by the roll pressing machine or the like, thereby forming the anode active material layer 32B. Thus, the anode 32 is obtained.

Subsequently, the cathode lead 35 is attached to the cathode collector 31A by welding or the like and the anode lead 36 is attached to the anode collector 32A by welding or the like. Thereafter, the cathode 31 and the anode 32 are wound through the separator 33, a front end portion of the cathode lead 35 is welded to the relief valve mechanism 25, a front end portion of the anode lead 36 is welded to the battery can 21, and the wound cathode 31 and anode 32 are sandwiched by the pair of insulating plates 22 and 23 and enclosed in the battery can 21. After the cathode 31 and the anode 32 were enclosed in the battery can 21, the electrolytic solution is injected into the battery can 21 and dipped into the separator 33. Thereafter, the battery cap 24, relief valve mechanism 25, and PTC element 26 are caulked and fixed to the open end portion of the battery can 21 through the gasket 27. Thus, the secondary battery shown in FIG. 8 is obtained.

According to the third embodiment, effects similar to those in the first embodiment mentioned above can be obtained.

EXAMPLE

Although the invention will specifically be explained by Examples hereinbelow, the present application is not limited only to those Examples.

In the following Examples and Comparisons, the particle diameter A of the cathode active material is equal to a mean diameter (middle diameter) D50. Specifically speaking, the particle diameter A is measured as follows. That is, the particle diameter A is measured as a mean value of the sizes of n (=10) particle which are observed by a scanning electron microscope (SEM). The particle diameter B of the inorganic oxide such as $Al_2O_3$ or the like is calculated as a mean value of the particle diameters measured with respect to ten particles which can be observed by the SEM.

According to non-aqueous electrolyte secondary batteries of Examples 1-1 to 2-2 and Comparisons 1-1 to 3-6, the inorganic oxide $Al_2O_3$ which does not contribute to the charge and discharge is dispersed into the cathode active material and the particle diameter A of the cathode active material and the particle diameter B of the inorganic oxide are changed. According to non-aqueous electrolyte secondary batteries of Comparisons 4-1 to 4-3, the cathode active material is coated with $Al_2O_3$ and the particle diameter B of $Al_2O_3$ is changed.

Comparison 1-1

(Manufacturing of Cathode)

A cathode is manufactured as follows. First, lithium iron phosphate of 90 weight parts whose particle diameter A is equal to 0.1 μm and which contains carbon of 3 wt %, polyvinylidene fluoride of 5 weight parts, carbon black of 5 weight parts, and N-methyl pyrolidone out of deal are kneaded by a mixer. Further, N-methyl pyrolidone NMP is added and dispersed so as to obtain a desired viscosity, thereby obtaining a cathode mixture paint. Subsequently, both surfaces of an aluminum foil having a thickness of 15 μm are coated with the cathode mixture paint, they are dried and, thereafter, pressed, thereby forming a cathode mixture layer. At this time, portions of about 30 mm in the portions of the aluminum foil exposed on the both surfaces are left. In this instance, the coating process is executed so that coated edges of the both surfaces are aligned almost on the same line. After that, they are cut into the shape shown in FIG. 4, thereby obtaining the cathode.

(Manufacturing of Anode)

An anode is manufactured as follows. First, artificial graphite of 90 weight parts, polyvinylidene fluoride of 5 weight parts, carbon black of 5 weight parts, and N-methyl pyrolidone out of deal are kneaded, thereby obtaining an anode mixture paint. Subsequently, both surfaces of a copper foil having a thickness of 15 μm are coated with the anode mixture paint, they are dried and, thereafter, pressed, thereby forming an anode mixture layer. At this time, portions of about 30 mm in the portions of the copper foil exposed on the both surfaces are left. In this instance, the coating process is executed so that coated edges of the both surfaces are aligned almost on the same line. After that, they are cut into the shape shown in FIG. 5, thereby obtaining the anode.

Before the collectors are coated and formed with the anode mixture layer and the cathode mixture layer, respectively, lithium doping ability per weight of the anode mixture and lithium dedoping ability per weight of the cathode mixture are preliminarily measured, thereby preventing the lithium doping ability per unit area of the anode mixture layer from exceeding the lithium dedoping ability per unit area of the cathode mixture layer.

(Manufacturing of Battery Element)

A battery element is manufactured as follows. First, a microporous film made of polypropylene having a thickness of 25 μm is cut into the shape shown in FIG. 6 and used as a separator. Subsequently, the nine anodes, eight cathodes, and sixteen separators obtained as mentioned above are laminated in order of the anode, separator, cathode, . . . , cathode, separator, and anode as shown in FIG. 3. Thus, the battery element containing therein sixteen basic laminate units each of which is constructed by the cathode mixture layer, separator, and anode mixture layer is obtained. Although the upper outermost layer and the lower outermost layer of the battery element become the anode mixture layers, since those portions do not face the cathode, they do not contribute to the battery reaction. Upon laminating, relative positions of the anode and the cathode are adjusted so that a plane of projection of the cathode mixture layer is enclosed inside of a plane of projection of the anode mixture layer when seen from the laminating direction.

Subsequently, the eight collector exposed portions of the cathode are simultaneously ultrasonic-welded to the cathode lead made of aluminum as shown in FIG. 2. Similarly, nine collector exposed portions of the anode are simultaneously ultrasonic-welded to the anode lead made of nickel. Subsequently, a solution obtained by dissolving $LiPF_6$ of 1 mol/l into an equivalent mixed solvent of ethylene carbonate EC and dimethyl carbonate DMC is prepared as a non-aqueous electrolytic solution. The non-aqueous electrolytic solution is dipped into the battery element. After that, a sheathing member made of an aluminum laminate film constructed by a resin layer, an aluminum layer, and a resin layer is used and an opening portion is thermally welded under a reduced pressure, thereby sealing the battery element. At this time, the sealing process is executed so that the cathode lead and the anode lead are exposed to the outside of the sheathing member through the thermally welded portions, and those leads are used as a cathode terminal and an anode terminal. In this manner, the desired non-aqueous electrolyte secondary battery is obtained.

Example 1-1

A cathode is manufactured as follows. First, a powder of lithium iron phosphate whose particle diameter A is equal to 0.1 μm and which contains carbon of 3 wt % and a powder of $Al_2O_3$ whose particle diameter B is equal to 0.05 μm are prepared. Subsequently, each powder is adjusted so that a basic weight of $Al_2O_3$ is equal to 3 weight parts, a basic weight of polyvinylidene fluoride is equal to 5 weight parts, a basic weight of carbon black is equal to 2 weight parts, and a basic weight of lithium iron phosphate is equal to 90 weight parts. $Al_2O_3$, polyvinylidene fluoride, and carbon black are added and kneaded by the mixer. After that, lithium iron phosphate is mixed and dispersed. Further, N-methyl pyrolidone is added and dispersed so as to obtain a desired viscosity, thereby obtaining a cathode mixture paint. Subsequently, both surfaces of an aluminum foil having a thickness of 15 μm are coated with the cathode mixture paint, they are dried and, thereafter, pressed, thereby forming a cathode mixture layer. At this time, portions of about 30 mm in the portions of the aluminum foil exposed on the both surfaces are left. In this instance, the coating process is executed so that coated edges of the both surfaces are aligned almost on the same line. After that, they are cut into the shape shown in FIG. 4, thereby obtaining the cathode.

Subsequently, a non-aqueous electrolyte secondary battery is obtained in a manner similar to Comparison 1-1 except that the cathode obtained as mentioned above is used.

Comparisons 1-2 to 1-5

Non-aqueous electrolyte secondary batteries are obtained in a manner similar to Example 1-1 except that the particle diameter B of the powder of $Al_2O_3$ is set to 0.1 μm, 0.5 μm, 1 μm, and 1.5 μm.

Examples 2-1 and 2-2, Comparisons 2-1 to 2-4

Non-aqueous electrolyte secondary batteries are obtained in a manner similar to Example 1-1 and Comparisons 1-1 to 1-5 except that the particle diameter A of the cathode active material is set to 0.5 μm.

Comparisons 3-1 to 3-6

Non-aqueous electrolyte secondary batteries are obtained in a manner similar to Example 1-1 and Comparisons 1-1 to 1-5 except that the particle diameter A of the cathode active material is set to 1 μm.

Comparison 4-1

A non-aqueous electrolyte secondary battery is obtained in a manner similar to Comparison 2-1.

Comparisons 4-2 and 4-3

First, a powder of lithium iron phosphate whose particle diameter A is equal to 0.5 μm and powders of $Al_2O_3$ whose particle diameters B are equal to 0.05 μm and 0.1 μm are prepared. Subsequently, those powders of $Al_2O_3$ and the powder of lithium iron phosphate are mixed in a dry manner and the surface of lithium iron phosphate is coated with $Al_2O_3$, thereby obtaining the cathode active material.

Subsequently, non-aqueous electrolyte secondary batteries are obtained in a manner similar to Comparison 1-1 except that the cathode active material obtained as mentioned above is used.

(Evaluation)

A DCR (Direct Current Resistance) of each of the laminate type non-aqueous electrolyte secondary batteries obtained as mentioned above is measured. The measurement is executed by a method whereby voltage values which are obtained when currents of 5 A, 10 A, 15 A, and 20 A are supplied for 10 seconds in a state where a charging state of the battery is equal to 50% are measured, and an inclination of a straight line obtained by plotting the currents and voltages is calculated as a DCR. Measurement results are shown in Table 1 and FIG. 10. A DCR ratio in FIG. 10 denotes a ratio (DCR2/DCR1) of a direct current resistance DCR2 of the battery manufactured by adding $Al_2O_3$ to the cathode to a direct current resistance DCR1 of the battery manufactured without adding $Al_2O_3$ to the cathode.

TABLE 1

| | ACTIVE MATERIAL PARTICLE DIAMETER A [μm] | PARTICLE DIAMETER B OF $Al_2O_3$ [μm] | DCR [mΩ] | B/A | DCR RATIO |
|---|---|---|---|---|---|
| COMPARISON 1-1 | 0.1 | — | 20 | — | — |
| EXAMPLE 1-1 | | 0.05 | 14 | 0.5 | 0.70 |
| COMPARISON 1-2 | | 0.1 | 33 | 1 | 1.65 |
| COMPARISON 1-3 | | 0.5 | 43 | 5 | 2.15 |
| COMPARISON 1-4 | | 1 | 70 | 10 | 3.50 |
| COMPARISON 1-5 | | 1.5 | 80 | 15 | 4.00 |
| COMPARISON 2-1 | 0.5 | — | 50 | — | — |
| EXAMPLE 2-1 | | 0.05 | 30 | 0.1 | 0.60 |
| EXAMPLE 2-2 | | 0.1 | 32 | 0.2 | 0.64 |
| COMPARISON 2-2 | | 0.5 | 60 | 1 | 1.20 |
| COMPARISON 2-3 | | 1 | 82 | 2 | 1.64 |
| COMPARISON 2-4 | | 1.5 | 105 | 3 | 2.10 |
| COMPARISON 3-1 | 1 | — | 90 | — | — |
| COMPARISON 3-2 | | 0.05 | 85 | 0.05 | 0.94 |
| COMPARISON 3-3 | | 0.1 | 80 | 0.1 | 0.89 |
| COMPARISON 3-4 | | 0.5 | 81 | 0.5 | 0.90 |
| COMPARISON 3-5 | | 1 | 85 | 1 | 0.94 |
| COMPARISON 3-6 | | 1.5 | 115 | 1.5 | 1.28 |
| COMPARISON 4-1 | 0.5 | — | 50 | — | — |
| COMPARISON 4-2 | | 0.05 | 48 | 0.1 | 0.96 |
| COMPARISON 4-3 | | 0.1 | 49 | 0.2 | 0.98 |

DCR RATIO: RATIO TO DCR OF BATTERY TO WHICH $Al_2O_3$ IS NOT ADDED

Figure 10:
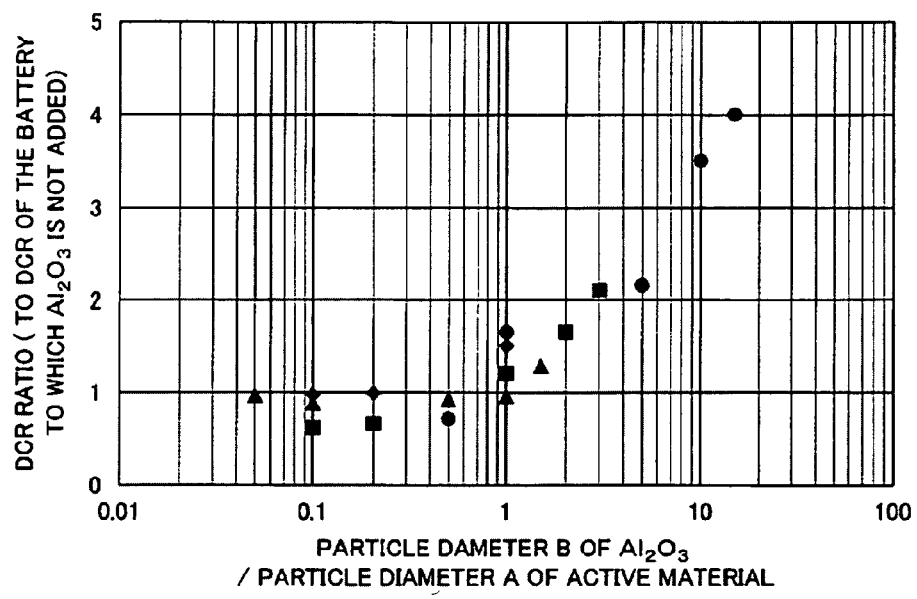
FIG. 10 is a graph showing evaluation results of Examples 1-1 to 2-2 and Comparisons 1-1 to 4-3.

The following points will be understood from Table 1 and FIG. 10.

(1) When $Al_2O_3$ whose particle diameter B is smaller than the particle diameter A of lithium iron phosphate has been added, there is such a tendency that the DCR can be reduced.

(2) When the particle diameter A of lithium iron phosphate is equal to 1 μm, a reducing effect of the DCR decreases. This is because it is presumed that since the particle diameter A of lithium iron phosphate is large, it is difficult to obtain an adding effect of $Al_2O_3$ as a filler. The particle diameter of 0.1 μm is an almost limit value of the particle diameter which can be handled.

(3) Although the DCR can be reduced in the case where $Al_2O_3$ has been dispersed into lithium iron phosphate, when the particle of the cathode active material has been coated with $Al_2O_3$, it is difficult to reduce the DCR and the DCR is almost constant.

When considering the above points, in order to improve the output characteristics, it is preferable that $Al_2O_3$ is dispersed into lithium iron phosphate, the particle diameter A of the lithium iron phosphate lies within the range from 0.1 μm to 0.5 μm, and the relation of A>B between the particle diameter A of the lithium iron phosphate and the particle diameter B of $Al_2O_3$ is satisfied.

Non-aqueous electrolyte secondary batteries of Examples 5-1 to 5-6 and Comparison 5-1 are manufactured by changing the addition amount of $Al_2O_3$.

Examples 5-1 to 5-6, Comparison 5-1

A cathode is manufactured as follows. First, a powder of lithium iron phosphate whose particle diameter A is equal to 0.5 μm and which contains carbon of 3 wt % is prepared. Subsequently, each powder is adjusted so that a basic weight of $Al_2O_3$ whose particle diameter B is equal to 0.1 μm is equal to 0 to 7 weight parts, a basic weight of polyvinylidene fluoride is equal to 5 weight parts, a basic weight of carbon black is equal to 2 weight parts, and a basic weight of lithium iron phosphate is equal to 86 to 93 weight parts. Subsequently, $Al_2O_3$, polyvinylidene fluoride, and carbon black are added and kneaded by the mixer. After that, lithium iron phosphate is mixed and dispersed. Further, N-methyl pyrolidone is added and dispersed so as to obtain a desired viscosity, thereby obtaining a cathode mixture paint. Both surfaces of an aluminum foil having a thickness of 15 μm are coated with the cathode mixture paint, they are dried and, thereafter, pressed, thereby forming a cathode mixture layer. At this time, portions of about 30 mm in the portions of the aluminum foil exposed on the both surfaces are left. In this instance, the coating process is executed so that coated edges of the both surfaces are aligned almost on the same line. After that, they are cut into the shape shown in FIG. 4, thereby obtaining the cathode.

Subsequently, non-aqueous electrolyte secondary batteries are obtained in a manner similar to Comparison 1-1 except that the cathode obtained as mentioned above is used.

(Evaluation)

A DCR of each of the laminate type non-aqueous electrolyte secondary batteries obtained as mentioned above is measured. The measurement is executed by a method whereby voltage values which are obtained when currents of 5 A, 10 A, 15 A, and 20 A are supplied for 10 seconds in a state where a charging state of the battery is equal to 50% are measured, and an inclination of a straight line obtained by plotting the currents and voltages is calculated as a DCR. After completion of the measurement of the DCRs, DCRs which are obtained after the charge and discharge at 45° C.

were repeated 300 times are measured and their change ratios are confirmed. Results are shown in Table 2 and FIGS. 11 and 12.

The DCR change ratio is calculated by the following equation.

DCR change ratio [%]=(DCR after the cycle test/ DCR before the cycle test)×100−100

Subsequently, $Al_2O_3$ is dispersed into N-methyl pyrolidone. Carbon black and polyvinylidene fluoride are added and kneaded by the mixer. After that, lithium iron phosphate is mixed and dispersed. Further, N-methyl pyrolidone is added and dispersed so as to obtain a desired viscosity, thereby obtaining a cathode mixture paint. Both surfaces of an aluminum foil having a thickness of 15 μm are coated with

TABLE 2

| | CONTENT OF $Al_2O_3$ [wt %] | BEFORE THE CYCLE TEST DCR [mΩ] | AFTER THE CYCLE TEST DCR [mΩ] | DCR CHANGE RATIO [%] |
|---|---|---|---|---|
| COMPARISON 5-1 | 0 | 50 | 103 | 106 |
| EXAMPLE 5-1 | 0.1 | 42 | 62 | 48 |
| EXAMPLE 5-2 | 0.5 | 38 | 45 | 18 |
| EXAMPLE 5-3 | 1 | 33 | 40 | 21 |
| EXAMPLE 5-4 | 3 | 32 | 38 | 19 |
| EXAMPLE 5-5 | 5 | 34 | 41 | 21 |
| EXAMPLE 5-6 | 7 | 47 | 90 | 91 |

Figure 11:
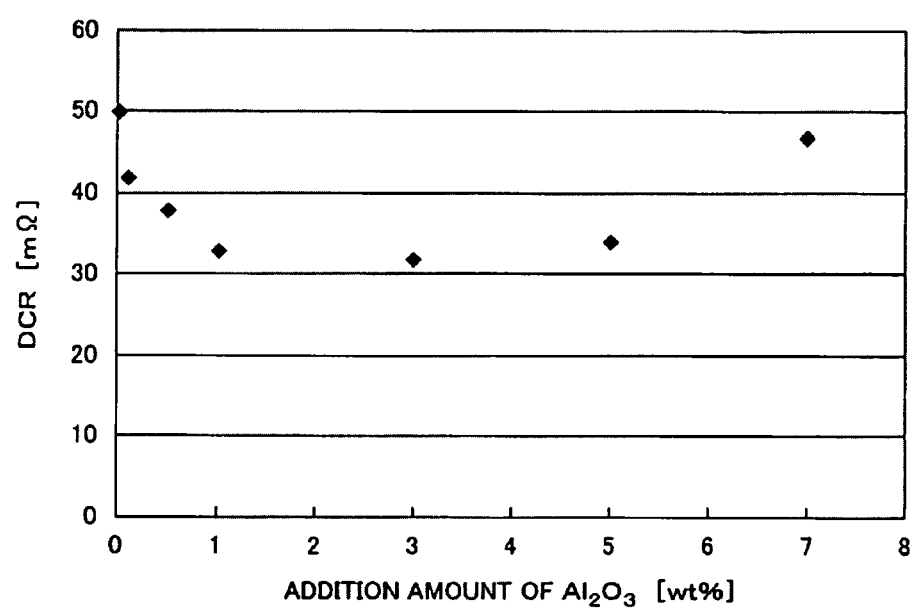
FIG. 11 is a graph showing evaluation results of Examples 5-1 to 5-6 and Comparison 5-1.
Figure 12:
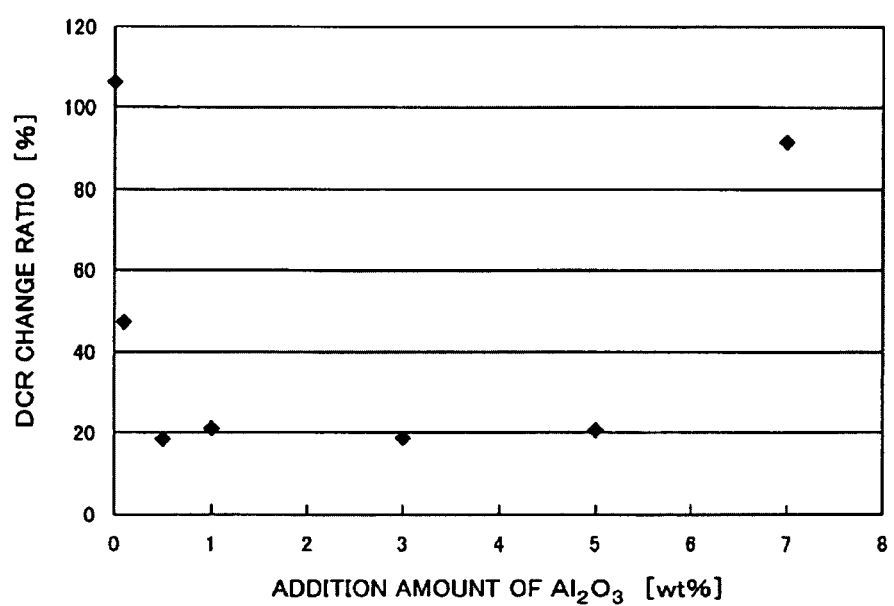
FIG. 12 is a graph showing the evaluation results of Examples 5-1 to 5-6 and Comparison 5-1.

The following points will be understood from Table 2 and FIGS. 11 and 12.

(1) The DCR before the cycle tests decreases suddenly when $Al_2O_3$ is added and, thereafter, it decreases until the addition amount of 1 wt %. The DCR is almost constant when the addition amount lies within a range from 1 wt % to 5 wt %. The DCR rises when the addition amount exceeds 5 wt %. The DCRs which are obtained after the cycle tests show a tendency almost similar to that of the DCRs which were obtained before the cycle tests.

(2) The DCR change ratio decreases suddenly until the addition amount of 0.1 wt %. The DCR change ratio is almost constant when the addition amount lies within a range from 0.1 wt % to 5 wt %. The DCR change ratio rises remarkably when the addition amount exceeds 5 wt %.

It is presumed that the reason why there is such a tendency that the DCR increases when the addition amount exceeds 5 wt % is that the fine particle of $Al_2O_3$ is difficult to be dispersed in the electrode. When the addition amount exceeds 5 wt %, a reduction in volume energy density is also caused. It is presumed that the reason why the DCR change ratio after the charge/discharge cycle tests at 45° C. is reduced due to the addition of $Al_2O_3$ is that the local cohesion of the binder is improved by the addition of $Al_2O_3$ and the influence by the swelling decreases.

When considering the above points, it will be understood that in order to improve the life characteristics at the high temperature, it is preferable that the addition amount of $Al_2O_3$ lies within the range from 0.1 wt % to 5 wt %.

Non-aqueous electrolyte secondary batteries of Examples 6-1 to 7-4 and Comparisons 6-1 to 6-4 are manufactured by changing the addition amount of the conductive assistant in order to confirm a synergy of $Al_2O_3$ and the conductive assistant.

Examples 6-1 to 6-4

A cathode is manufactured as follows. First, a powder of lithium iron phosphate whose particle diameter A is equal to 0.5 μm and which contains carbon of 3 wt % is prepared. Subsequently, each powder is adjusted so that a basic weight of $Al_2O_3$ whose particle diameter B is equal to 0.1 μm is equal to 3 weight parts, a basic weight of polyvinylidene fluoride is equal to 5 weight parts, a basic weight of carbon black is equal to 1 to 4 weight parts, and a basic weight of lithium iron phosphate is equal to 88 to 91 weight parts.

the cathode mixture paint, they are dried and, thereafter, pressed, thereby forming a cathode mixture layer. At this time, portions of about 30 mm in the portions of the aluminum foil exposed on the both surfaces are left. In this instance, the coating process is executed so that coated edges of the both surfaces are aligned almost on the same line. After that, they are cut into the shape shown in FIG. 4, thereby obtaining the cathode.

Subsequently, a non-aqueous electrolyte secondary battery is obtained in a manner similar to Comparison 1-1 except that the cathode obtained as mentioned above is used.

Examples 7-1 to 7-4

Non-aqueous electrolyte secondary batteries are obtained in a manner similar to Examples 6-1 to 6-4 except that fibrous carbon is used as a conductive assistant.

Comparisons 6-1 to 6-4

Non-aqueous electrolyte secondary batteries are obtained in a manner similar to Examples 6-1 to 6-4 except that cathodes are manufactured without adding $Al_2O_3$.
(Evaluation)

A DCR of each of the laminate type non-aqueous electrolyte secondary batteries obtained as mentioned above is measured. The measurement is executed by a method whereby voltage values which are obtained when currents of 5 A, 10 A, 15 A, and 20 A are supplied for 10 seconds in a state where a charging state of the battery is equal to 50% are measured, and an inclination of a straight line obtained by plotting the currents and voltages is calculated as a DCR. Results are shown in FIGS. 13 and 14.

Figure 13:
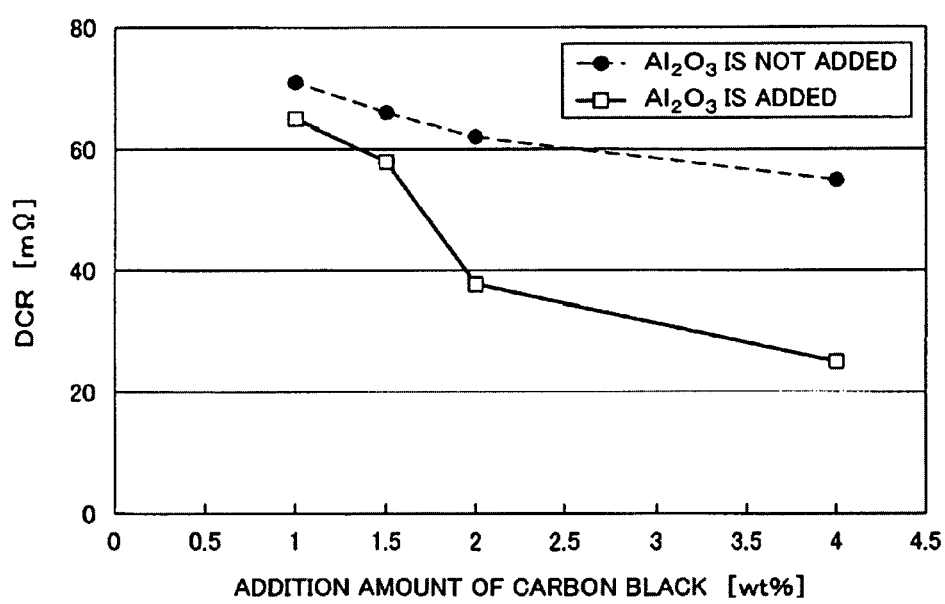
FIG. 13 is a graph showing evaluation results of Examples 6-1 to 6-4.
Figure 14:
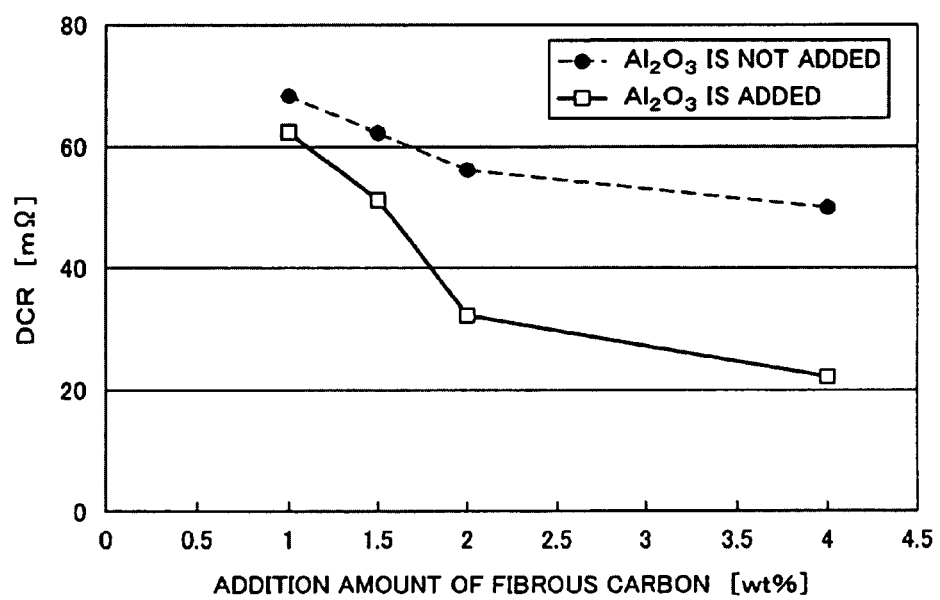
FIG. 14 is a graph showing evaluation results of Examples 7-1 to 7-4.

The following points will be understood from FIGS. 13 and 14. When the addition amount of carbon black is equal to or more than 1.5 wt %, the effect of the DCR reduction owing to the addition of $Al_2O_3$ appears remarkably. When the addition amount is equal to or more than 2 wt %, the effect becomes remarkable. Such a tendency is similar to that in the case of using fibrous carbon as a conductive assistant. It is presumed that the reason why the effect of the DCR reduction does not appear remarkably when the addition amount is small is that the dispersing state of the conductive assistant and the binder can be maintained to a certain degree even in the case of using the method in the related art.

When considering the above points, it will be understood that it is preferable that the addition amount of the conductive assistant is equal to 1.5 wt % or more, and much preferably, 2 wt % or more.

Non-aqueous electrolyte secondary batteries of Examples 8-1 to 11-5 and Comparisons 7-1 to 10-1 are obtained by adding $ZrO_2$, $Bi_2O_3$, $La_2O_3$, or $Nd_2O_3$ in place of $Al_2O_3$ as an inorganic oxide.

Examples 8-1 to 8-5, Comparison 7-1

A cathode is manufactured as follows. First, a powder of lithium iron phosphate whose particle diameter A is equal to 0.5 μm and which contains carbon of 3 wt % is prepared. Subsequently, each powder is adjusted so that a basic weight of $ZrO_2$ whose particle diameter B is equal to 0.1 μm is equal to 0 to 7 weight parts, a basic weight of polyvinylidene fluoride is equal to 5 weight parts, a basic weight of carbon black is equal to 2 weight parts, and a basic weight of lithium iron phosphate is equal to 86 to 93 weight parts. Subsequently, $ZrO_2$, carbon black, and polyvinylidene fluoride are added and kneaded by the mixer. After that, lithium iron phosphate is added, mixed, and dispersed. Further, N-methyl pyrolidone is added and dispersed so as to obtain a desired viscosity, thereby obtaining a cathode mixture paint. Both surfaces of an aluminum foil having a thickness of 15 μm are coated with the cathode mixture paint, they are dried and, thereafter, pressed, thereby forming a cathode mixture layer. At this time, portions of about 30 mm in the portions of the aluminum foil exposed on the both surfaces are left. In this instance, the coating process is executed so that coated edges of the both surfaces are aligned almost on the same line. After that, they are cut into the shape shown in FIG. 4, thereby obtaining the cathode.

Subsequently, a non-aqueous electrolyte secondary battery is obtained in a manner similar to Comparison 1-1 except that the cathode obtained as mentioned above is used.
(Evaluation)

A DCR of each of the laminate type batteries obtained as mentioned above is measured. The measurement is executed by a method whereby voltage values which are obtained when currents of 5 A, 10 A, 15 A, and 20 A are supplied for 10 seconds in a state where a charging state of the battery is equal to 50% are measured, and an inclination of a straight line obtained by plotting the currents and voltages is calculated as a DCR. A result is shown in FIG. 15.

Figure 15:
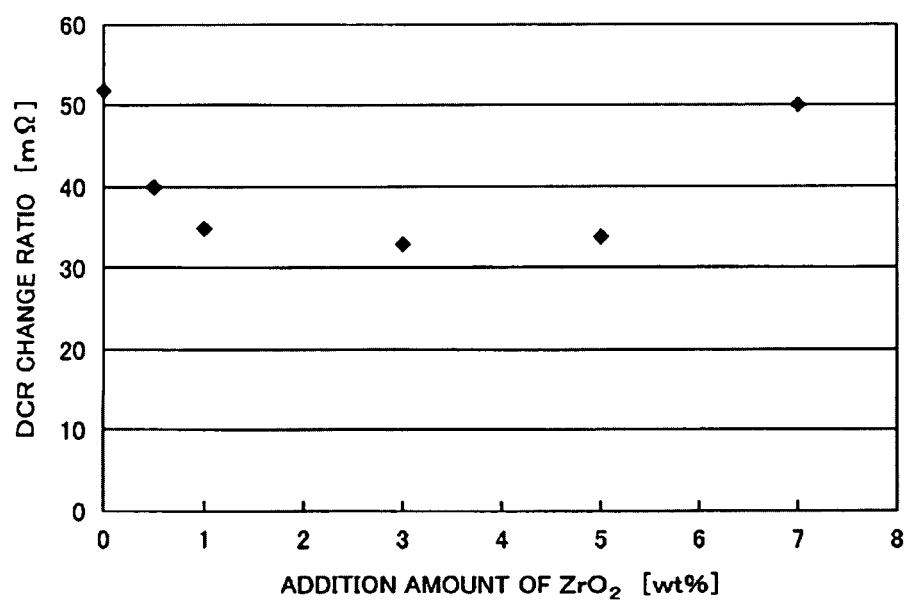
FIG. 15 is a graph showing evaluation results of Examples 8-1 to 8-5 and Comparison 7-1.

It will be understood from FIG. 15 that, even if $ZrO_2$ is added, a DCR reducing effect similar to that in the case of adding $Al_2O_3$ is obtained.

Examples 9-1 to 9-5, Comparison 8-1

Figure 16:
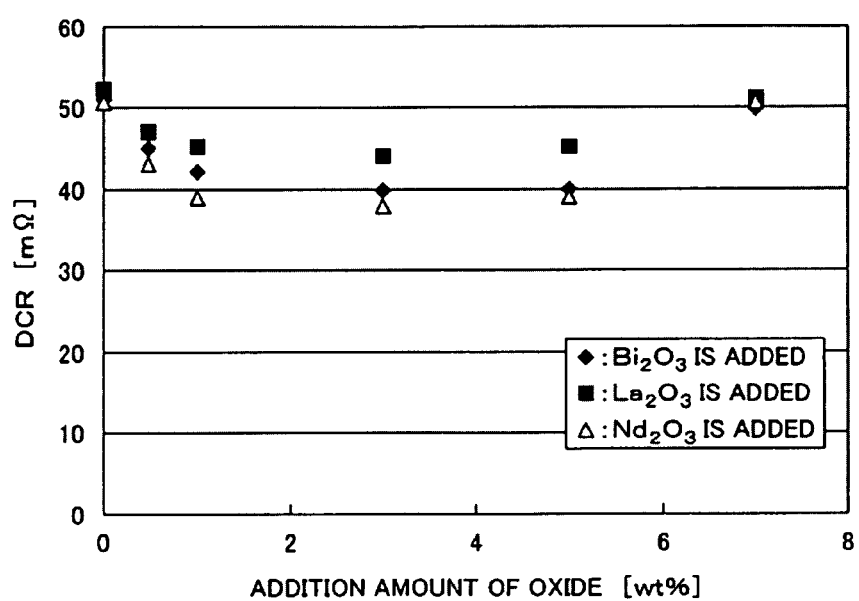
FIG. 16 is a graph showing evaluation results of Examples 9-1 to 11-5 and Comparisons 8-1 to 10-1.

Secondary batteries are manufactured in a manner similar to Examples 8-1 to 8-5 and Comparison 7-1 except that $Bi_2O_3$ whose particle diameter B is equal to 0.1 μm is used in place of $ZrO_2$ and DCRs are evaluated. A result is shown in FIG. 16.

Examples 10-1 to 10-5, Comparison 9-1

Secondary batteries are manufactured in a manner similar to Examples 8-1 to 8-5 and Comparison 7-1 except that $La_2O_3$ whose particle diameter B is equal to 0.1 μm is used in place of $ZrO_2$ and DCRs are evaluated. A result is shown in FIG. 16.

Examples 11-1 to 11-5, Comparison 10-1

Secondary batteries are manufactured in a manner similar to Examples 8-1 to 8-5 and Comparison 7-1 except that $Nd_2O_3$ whose particle diameter B is equal to 0.1 μm is used in place of $ZrO_2$ and DCRs are evaluated. A result is shown in FIG. 16.

It will be understood from FIG. 16 that, even if $Bi_2O_3$, $La_2O_3$, or $Nd_2O_3$ is added, a DCR reducing effect similar to that in the case of adding $Al_2O_3$ is obtained. A similar effect can be also obtained when an oxide other than those oxides is used. A similar effect can be also obtained when, for example, $Sc_2O_3$ or $Y_2O_3$ as an oxide of scandium Sc or yttrium Y as an element of the same Group 3 as that of lanthanum La is added. Further, a similar effect can be also obtained when an oxide of cerium Ce or samarium Sm as lanthanoids similar to lanthanum La or neodymium Nd is added.

Although the embodiments and Examples have specifically been described above, the invention is not limited to the foregoing embodiments and Examples but various modifications based on a technical idea are possible.

For instance, the numerical values mentioned in the above embodiments and Examples are nothing but examples and other numerical values different from them may be used as necessary.

Although the above embodiments and Examples have been described with respect to the examples in which the invention is applied to the non-aqueous electrolyte secondary batteries of the flat type and the cylindrical type, the shape of the battery is not particularly limited to them. The present application can be also applied to a non-aqueous electrolyte secondary battery of a coin type, a button type, a rectangular type, or the like.

Although the above embodiments and Examples have been described with respect to the case where the electrolyte is an electrolytic solution or a gel-like electrolyte as an example, another electrolyte can be also used in place of those electrolytes. As another electrolyte, for example, a high molecular solid electrolyte using an ion conductive high molecule, an inorganic solid electrolyte using an ion conductive inorganic material, or the like can be mentioned. Each of them can be solely used or may be combined with another electrolyte and used. As a high molecular compound which can be used for the high molecular solid electrolyte, for instance, polyether, polyester, polyphosphazene, polysiloxane, or the like can be mentioned. As an inorganic solid electrolyte, for instance, ion conductive ceramics, an ion conductive crystal, ion conductive glass, or the like can be mentioned.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A cathode mixture for a non-aqueous electrolyte secondary battery, comprising:
   (a) cathode active material particles having an olivine type crystal structure; and
   (b) inorganic oxide particles which do not contribute to charge and discharge,
   wherein a content of the inorganic oxide is from 0.1 wt % to 5 wt % of the cathode mixture, a particle diameter A of the cathode active material particles ranges from 0.1 μm or more to 0.5 μm or less, the cathode active material particles are not secondarily aggregated, a particle diameter B of the inorganic oxide particles is from 0.05 µm to 0.1 µm, and the particle diameter A of the cathode active material is greater than the particle diameter B of the inorganic oxide particles;

(c) a conductive assistant and (d) a binder have been adhered onto a particle surface of the inorganic oxide particles, wherein a content of the conductive assistant is 2 wt % or more of the cathode mixture, the inorganic oxide particles with the conductive assistant and the binder adhered thereto are dispersed between the cathode active material particles in the cathode mixture, and the inorganic oxide comprises $Nd_2O_3$.

2. The cathode mixture for the non-aqueous electrolyte secondary battery according to claim 1, wherein the content of the conductive assistant ranges from 2 wt % or more to 10 wt % or less of the cathode mixture.

3. The cathode mixture for the non-aqueous electrolyte secondary battery according to claim 1, wherein the conductive assistant is selected from the group consisting of carbon black, fibrous carbon, and a combination thereof.

4. The cathode mixture for the non-aqueous electrolyte secondary battery according to claim 1, wherein the cathode active material particles comprise 3 wt % of carbon.

5. The cathode mixture for the non-aqueous electrolyte secondary battery according to claim 1, wherein a content of the cathode active material particles is from 86 wt % to 93 wt % of the cathode mixture.

6. The cathode mixture for the non-aqueous electrolyte secondary battery according to claim 1, wherein the inorganic oxide further comprises $Sm_2O_3$.

7. A non-aqueous electrolyte secondary battery comprising: a cathode; an anode; and a non-aqueous electrolyte, wherein the cathode contains (i) cathode active material particles having an olivine type crystal structure and (ii) inorganic oxide particles which do not contribute to charge and discharge, a content of the inorganic oxide is from 0.1 wt % to 5 wt % of the cathode, a particle diameter A of the cathode active material particles ranges from 0.1 µm or more to 0.5 µm or less, the cathode active material particles are not secondarily aggregated, a particle diameter B of the inorganic oxide particles is from 0.05 µm to 0.1 µm, and the particle diameter A of the cathode active material is greater than the particle diameter B of the inorganic oxide particles, (iii) a conductive assistant and (iv) a binder have been adhered onto a particle surface of the inorganic oxide particles, a content of the conductive assistant is 2 wt % or more of the cathode, the inorganic oxide particles with the conductive assistant and the binder adhered thereto are dispersed between the cathode active material particles in the cathode, and the inorganic oxide comprises $Nd_2O_3$.

8. The non-aqueous electrolyte secondary battery according to claim 7, wherein the conductive assistant is selected from the group consisting of carbon black, fibrous carbon, and a combination thereof.

9. The non-aqueous electrolyte secondary battery according to claim 7, wherein the cathode active material particles comprise 3 wt % of carbon.

10. The non-aqueous electrolyte secondary battery according to claim 7, wherein a content of the cathode active material particles is from 86 wt % to 93 wt % of the cathode.

11. The non-aqueous electrolyte secondary battery according to claim 7, wherein the inorganic oxide further comprises $Sm_2O_3$.

* * * * *